United States Patent [19]

Todd

[11] Patent Number: 4,479,752
[45] Date of Patent: Oct. 30, 1984

[54] MOTOR VEHICLE ADAPTED FOR DISABLED DRIVER

[76] Inventor: Robert E. Todd, 7 Rosamund Pl., Blyth, Northumberland, England

[21] Appl. No.: 445,992

[22] Filed: Dec. 1, 1982

[30] Foreign Application Priority Data

Dec. 10, 1981 [GB] United Kingdom ............... 8137268
Jan. 22, 1982 [GB] United Kingdom ............... 8201840

[51] Int. Cl.³ .............................................. B60R 9/00
[52] U.S. Cl. ................................. 414/462; 414/921; 296/65 R; 180/333
[58] Field of Search ............ 296/65 R, 146; 180/333, 180/315; 414/921, 462; 410/3, 4, 6; 280/242 WC; 297/DIG. 4

[56] References Cited

U.S. PATENT DOCUMENTS

| | | | |
|---|---|---|---|
| 2,753,947 | 7/1956 | Mach | 296/65 |
| 3,089,560 | 5/1963 | Priest | 180/333 |
| 3,236,556 | 2/1966 | Lathers | 296/65 R |
| 3,613,914 | 10/1971 | Jackle | 414/6 |
| 4,236,860 | 12/1980 | Gottlieb et al. | 414/462 |
| 4,272,218 | 6/1981 | Carter | 414/462 |
| 4,378,888 | 4/1983 | Reed | 296/37.13 |
| 4,392,690 | 7/1983 | Anderson | 280/242 WC |

*Primary Examiner*—Robert R. Song
*Attorney, Agent, or Firm*—Cushman, Darby & Cushman

[57] ABSTRACT

A motor vehicle is adapted to enable ready entry and exit of the vehicle for a disabled person from or into his wheel-chair, and also to enable convenient storage of the folded wheel-chair in the vehicle. The adaptation consists in the provision of a seat which can be moved from a normal position within the vehicle to a displaced position projecting laterally outwardly of the vehicle, whereby the disabled person can readily slide himself from his wheel-chair into the seat and vice versa, and also in the provision of storage means on the inside of the door adjacent to the seat into which the folded wheel-chair can be located for retention on said door between the door and the seat.

15 Claims, 18 Drawing Figures

MOTOR VEHICLE ADAPTED FOR DISABLED DRIVER

BACKGROUND OF THE INVENTION

This invention relates to a motor vehicle adapted for use by a disabled person normally confined to a wheelchair.

Specialised motor vehicles primarily for use by disabled persons, in particular such persons normally in wheel-chairs, are well established. However the specific shapes, some of which allow only one occupant, and often the colour of such vehicles, are such that these are readily and immediately identifiable as cars for the disabled—thus the drivers themselves are constantly reminded of their disabilities which are often deeply and sincerely felt, while the vehicles themselves are less safe, more expensive and require more frequent servicing than normal production cars. Other cars, although adapted to a certain extent for disabled persons, are often still such as to require the drivers to seek or call for assistance in entering and leaving them.

SUMMARY OF THE INVENTION

It is an object of the present invention to provide a general-purpose standard production private passenger car suitably adapted to enable use by disabled persons, particularly those with a wheel-chair, but in which the adaptation is not immediately obvious, thereby allowing the disabled driver and/or the passenger the benefits of economy, comfort, ease of operation, reliability and sense of equality with the able-bodied driver.

According to the present invention there is provided a motor vehicle comprising a seat, preferably the driver's seat, movable from a normal position within the vehicle to a displaced position projecting laterally outwardly of the vehicle and, on the inside of the door adjacent said seat, storage means for retaining a folded wheel-chair between said door and the seat.

Preferably the seat is mounted to be slidable laterally of the vehicle between its normal and displaced positions, for example along a pair of rails extending transversely of the vehicle, while said seat may also be movable fore and aft of the vehicle and vertically.

The storage means inside the door may comprise a recess within the door, conveniently circular, to receive one wheel of the wheel-chair, together with retaining means for reacting between the door and the wheel-chair to retain said wheel-chair against the door.

Preferably a lifting member, which may be operated by any convenient means such as manually, mechanically, pneumatically, hydraulically or electro-mechanically, is provided on the inside of said door to raise the folded or collapsed wheel-chair from the ground into the storage position. Such a member may not be necessary if the driver has sufficient strength himself to raise the wheel-chair into the storage position. Conveniently said lifting member comprises an arm one end of which is pivotal about a substantially horizontal axis on the door and the other end of which is shaped to carry thereon the wheel-chair.

It will be appreciated that such an arrangement enables a person in a collapsible wheel-chair to open the car door, pull the driving seat outwardly towards him, position the wheel-chair alongside the seat, remove the arm-rest of the wheel-chair adjacent the car, slide from the wheel-chair onto the seat, collapse or fold the wheel-chair, attach it to the lifting member and raise it into the storage position, secure the wheel-chair to the inside of the door, move the seat back to its normal driving position and close the door. Securing of the wheel-chair to the door may occur automatically at the end of the lifting operation.

One or more of the other seats in a vehicle may also be movable from a normal position within the vehicle to a displaced position projecting laterally outwardly of the vehicle, while the inside of the door associated with the or each other seat may have wheel-chair storage means thereon.

The wheel-chair for storing inside the door is of a collapsible nature and is preferably of the type from which at least one wheel can be readily removed. Ideally, the wheel-chair in its collapsed state is so small as to be completely below the level of the bottom of the window of the associated door, allowing unrestricted sideways vision for the short-trunked. Further, the textile/plastic seat folded over the metal frame of the wheel-chair can offer an arm-rest for the driver, while the below window-level positioning of the wheel-chair itself can partially conceal the driver's disablement from outside viewers.

In a preferred wheel-chair the handles are movable from a normal, substantially horizontal position to a collapsed position, while said movement of the handles may be accompanied by release of a wheel-retaining mechanism whereby said wheel can be removed from the wheel-chair for storage within the vehicle, thereby allowing more room for the driver's movements.

The driving controls, in particular the accelerator and brake, of established vehicles for disabled people are commonly adapted for hand operation. However many of these manually-operated controls are relatively complex and can be inconvenient for the disabled driver. Further, should any able-bodied person wish to share the driving of such vehicles on long journeys, said person may find it impossible to drive the car with normal pedal operation, or, alternatively may find it difficult to adapt to the use of certain types of hand controls that exist.

Thus, a preferred motor vehicle according to the present invention comprises a steering column to the upper end of which, adjacent the steering wheel, is pivotally secured one end of a hand-control lever for a brake and accelerator control mechanism, said mechanism including a rigid tubular member one end of which is secured to the brake pedal of the vehicle and the other end of which is located adjacent to but below said lever, a rigid rod member extending through, to be slidable in, said tubular member, the upper end of said rod member being attached to the lever and the lower end of said rod member being connected to the end of the accelerator control cable remote from the carburettor, and abutment means fixedly mounted on the rod member adjacent the upper end thereof for engagement with the other end of the tubular member to determine the limit of downward movement of the rod member relative to the tubular member, the mechanism having a neutral position in which the abutment means lies adjacent to the upper end of the tubular member, the brake is off and the accelerator is closed, the arrangement being such that, on pivoting movement of the lever in one direction from the neutral position to draw the rod member through the tubular member, the engine is accelerated and, on pivoting movement of the lever in the other direction from the neutral position, the rod member and tubular member are moved downwardly together to actuate the brake.

Such an arrangement allows driving by using, purely by choice and without the necessity for any mechanical adaptation, either the hand controls or the pedals, whether the driver be disabled or not.

Conveniently the lower end of the rod member is connected to the accelerator cable by means of a pivotal lever, one end of said lever being mounted to the rod member and the other end of said lever having the accelerator cable secured thereto, the lever being pivotal about an intermediate axis fixed relative to the tubular member.

DESCRIPTION OF THE PREFERRED EMBODIMENT

Figure 1:
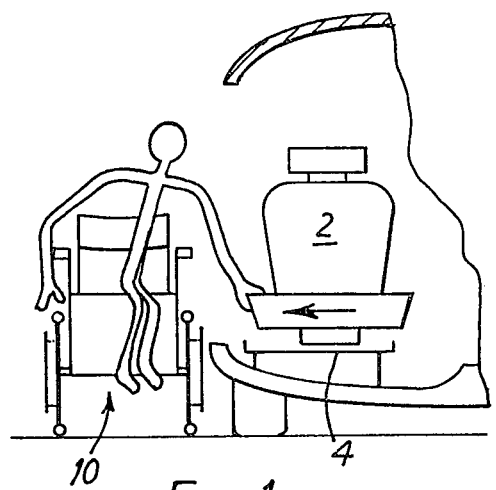
FIGS. 1 to 10 show schematically and in sequence the steps involved for a disabled person to move from his wheel-chair into a driving position in a vehicle according to the invention.
Figure 2:
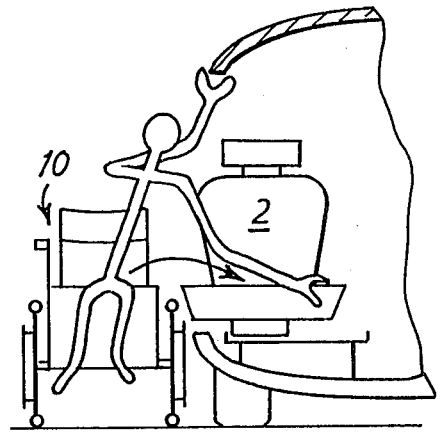

Referring to the FIGS. 1 to 10 there are shown parts of a standard production motor car internally adapted in accordance with the invention. More particularly, the driver's seat 2, as well as being movable fore and aft of the vehicle, can slide transversely of the car on a pair of tracks 4 from a normal driving position, through an intermediate displaced position shown in FIG. 1, to an outwardly displaced position in which the outer edge of the seat projects slightly from the car as seen in, for example, FIG. 2. Straps or the like may be attached to the seat to facilitate the sliding movement, while said seat may also be movable up and down, for example under the control of a rotatable handlewheel forming part of a rack and pinion mechanism. Conveniently braking mechanisms are provided for all three directional movements of the seat 2, while the seat is self-locking in its normal and fully displaced positions on the transverse tracks.

The internal surface of the door 6 of the car associated with the seat 2 is recessed at 8, said recess conveniently being of circular shape and of diameter just greater than that of the hand-propulsion wheel of a collapsible wheel-chair such as that shown generally at 10.

One end of a lifting arm 12 is pivotally mounted at 14 to the inside of the door 6, the free end of said arm being provided with a spigot 16 or equivalent fixing mechanism for reasons to be detailed below. A winder mechanism including a handle 18 is mounted in the door 6 to react with the lifting arm 12 in such a manner that rotation of said handle 18 enables movement of the lifting arm 12 between a lowermost position shown in FIG. 4 and a raised position shown in full lines in FIG. 5. The winder mechanism may incorporate spring assistors, down-gearing or ratchet levers to assist operation, while movement of the arm 12 may be achieved by, for example, an electric motor.

In order to transfer himself from the collapsible wheel-chair 10 to the driver's seat 2, a disabled person carries out, in sequence, the steps illustrated in FIGS. 1 to 10. With his wheel-chair 10 alongside the driver's door opening in the car, as in FIG. 1, he draws the seat 2 outwardly along the tracks 4 through the intermediate position of FIG. 1 into the fully displaced position of FIG. 2 and brakes the seat.

Figure 3:
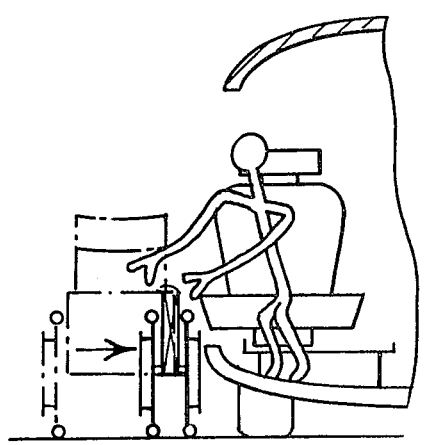
Figure 4:
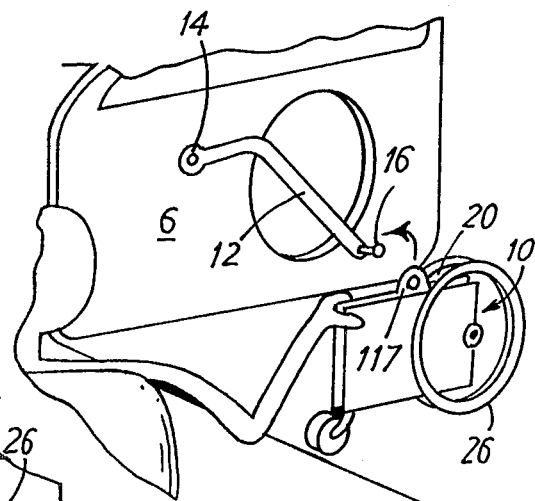

After removing the left-hand arm-rest of the wheel-chair 10, and by pulling on suitably-positioned belts, grips, bars or the like, the disabled person then maneuvers himself from his wheel-chair onto the driving seat 2 which may be covered with a low friction material such as polythene or p.v.c. He then folds or collapses his wheel-chair 10 as shown in FIG. 3 and, with the lifting arm 12 in its lowermost position, mounts the chair 10 onto the spigot 16 or other fixing mechanism of the arm 12 (FIG. 4).

Figure 5:
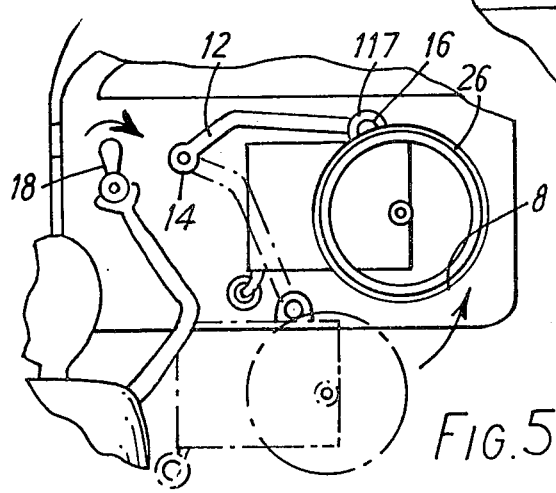
Figure 6:
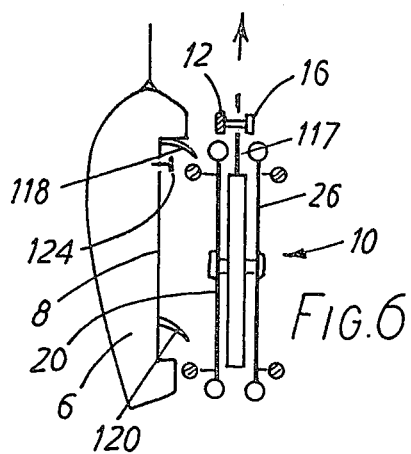
Figure 7:
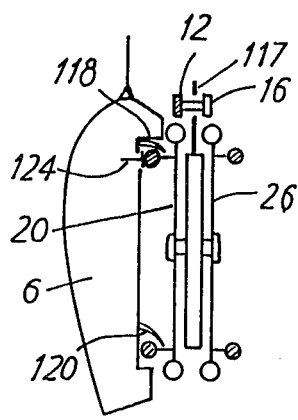

The winder mechanism is then actuated, either by rotation of the handle 18 or by operation of the associated motor, to raise the arm 12 and attached wheelchair level with the recess 8 in the door as seen in FIGS. 5 and 6, and the wheel-chair is then drawn automatically towards the door until the hand-propulsion wheel of the wheel 20 is received within the recess (FIG. 7), the wheel-chair, still being supported by the lifting arm 12. In this position, the wheel may be locked automatically onto the door as the final part of its movement, or, alternatively, upper and lower clamps or like fixing devices may be actuated to retain the wheel-chair 10 in its stored position on the door 6.

Figure 8A:
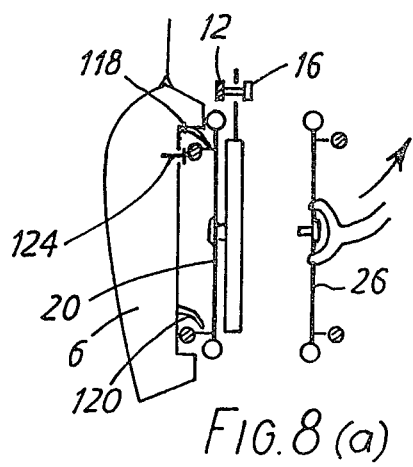
Figure 8B:
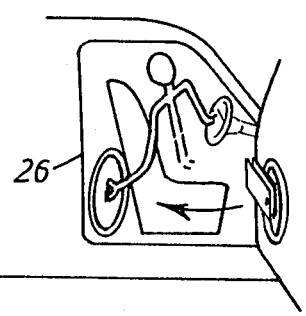
Figure 9:
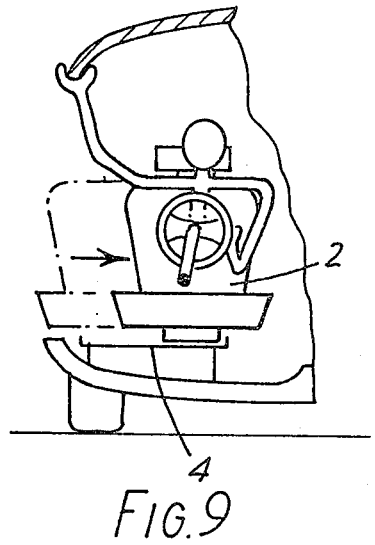
Figure 10:
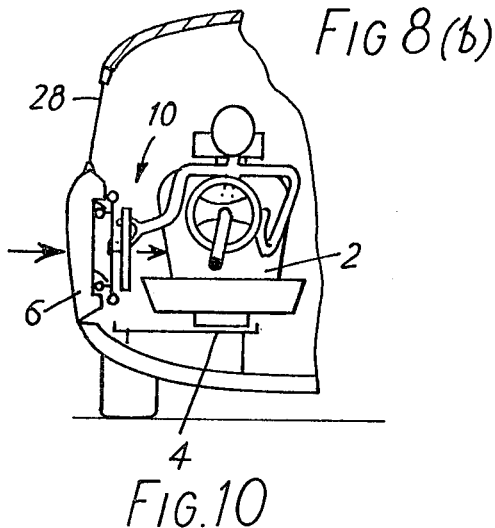

The wheel 26 of the wheel-chair 10, nearest the driver can, if desired, then be removed, as shown in FIG. 8a, and the wheel stored in a convenient position within the vehicle as shown in FIG. 8b. The driver then slides the seat 2 inwardly of the car into a driving position behind the steering wheel and adjusts the seat in the fore and aft and vertical directions. As can be seen in FIG. 9, the driving position of seat 2 may be somewhat inward of the standard position, the steering column and associated control mechanisms having been moved accordingly. Thus, when the driver closes the door 6 as shown in FIG. 10 there is plenty of room for the wheel-chair 10 without impeding the driver, and without the driver encroaching on the front passenger space alongside whilst still maintaining the room necessary for handbrake and gear lever manipulation by the driver as well as the fastening of his seat-belt.

The lifting arm 12 may be detachable from the door 6, while the spigot 16 may be pivotal through 90° to a position parallel with the inner surface of the door 6 not pointing towards the driver's body. The arm 12 may be formed in one or more sections with fine adjustment possible to vary the length thereof, a fixing mechanism for the wheel-chair being provided at the free end and not protruding into the car. Alternatively any equivalent hoist mechanism may be used, to be operated manually or by motorised propulsion through cog and ratchet, screw and worm, chain or other equivalent arrangements.

One or more of the other seats in the vehicle may be laterally slidable in the manner of seat 2 while said seats, as well as seat 2, can be covered with low friction material to facilitate sliding thereon, and grab-handles, straps or the like can be suitably positioned throughout the car including on the boot lid, hood or rear hatch door.

The driver's window 28 may be raised and lowered manually or electrically, while brake/stop mechanisms may be incorporated in all three directional movements of the seat 2—further, said movements may be power-operated.

In order to dismount from a vehicle, the driver performs the steps of FIGS. 1 to 10 in reverse.

Figures 11A, 11B:
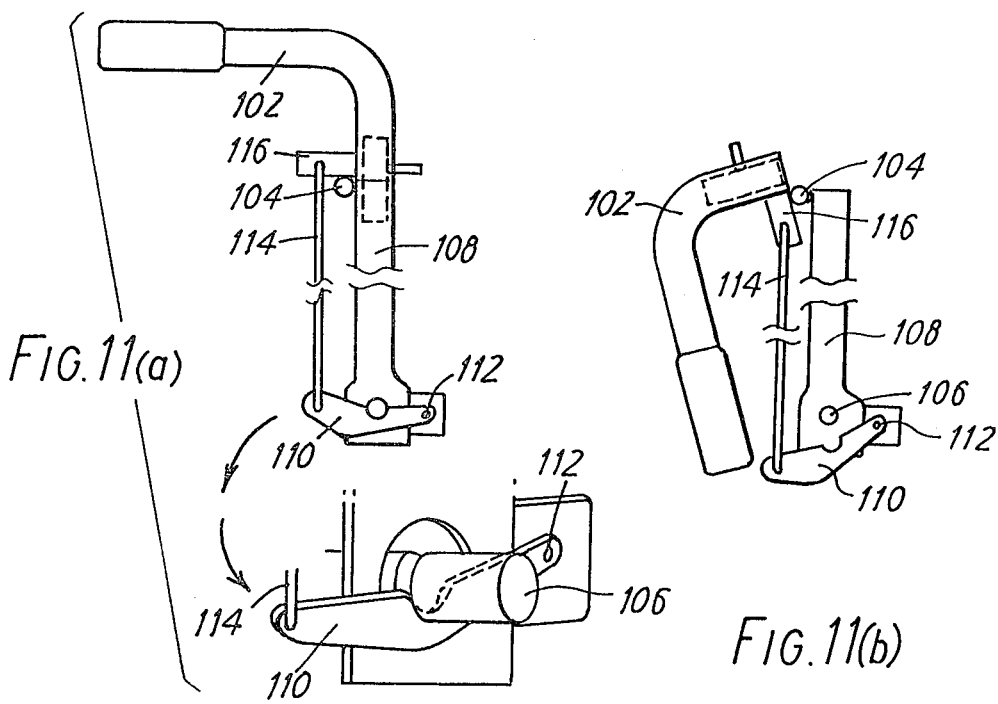
FIGS. 11a and 11b show detail of a preferred wheelchair for storage in the vehicle of the invention.
Figure 13:
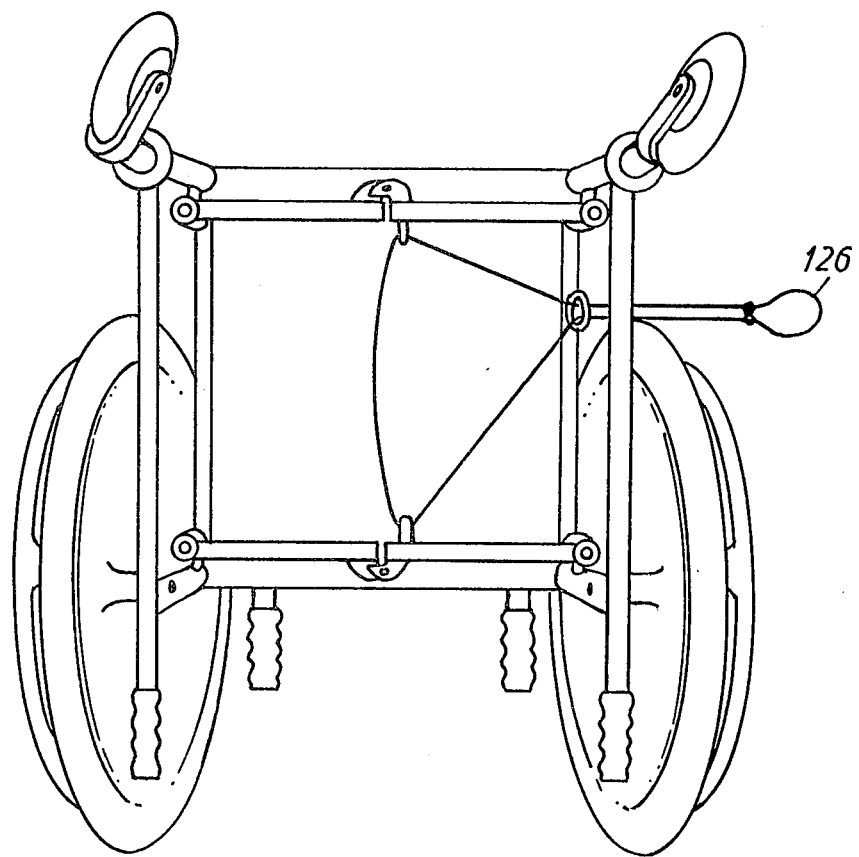
FIG. 13 is an underneath plan view of a preferred wheel-chair for use with a vehicle according to the invention.

In order to facilitate mounting of the wheel-chair 10 on the lifting arm 12 and to make said chair as compact as possible when collapsed, the wheel-chair may incorporate, amongst other things, the features shown in FIGS. 11a, 11b and 13.

The handles 102 of the wheel-chair 10 are hinged at 104 to enable them to be pivoted from the operative position of FIG. 11a to the stored position of FIG. 11b. The axle 106 of the wheel 26 is provided with a circular slot therein inwardly of the chair frame 108, a catch-plate 110 pivotal about a fixed point 112 on the chair normally being received within said slot, as shown in FIG. 11a, to prevent removal of the wheel 26.

A rigid rod 114 extends between a bracket 116 welded to a handle 102 above the associated hinge 104 and the free end of the plate 110 remote from the pivot 112 such that, on pivoting the handle 102 to its stored position, the plate 110 is pivoted to the position shown in FIG. 11b out of engagement with the axle 106 whereby the wheel 26 can be removed from the chair.

Conveniently the wheel-chair 10 further includes a plate 117 with a hole therethrough fixed to the point of balance on the top of the main frame, through which can be passed the spigot 16 on the lifting arm 12 in a manner which does not hinder in any way the folding or closure of the wheel-chair, the plate 117 not interfering in any way with the person on the wheel-chair.

The foot-steps at either side of the chair are preferably removable but, if they are not and are pivotal into stored positions, the quick release mechanisms therefor are conveniently mounted at slightly different levels so that, on collapsing the chair, the steps do not abut one another but overlie one another. This enables the width of the collapsed chair to be reduced compared with standard arrangements, giving more room for the driver. Further, the rear and front transverse frames of the chair are also provided at different levels and, as can be seen in FIG. 13, are both centrally hinged so that, on collapsing the wheel-chair, they do not abut but are positioned one above the other, again to reduce the width of the collapsed chair.

FIG. 13 also shows the provision of a draw-cord 126 below the seat of the wheel-chair which can be pulled to facilitate collapsing of the wheel-chair, said draw-cord being attached to one half of each of the hinged front and rear transverse frames.

Figures 12A, 12B, 12C:
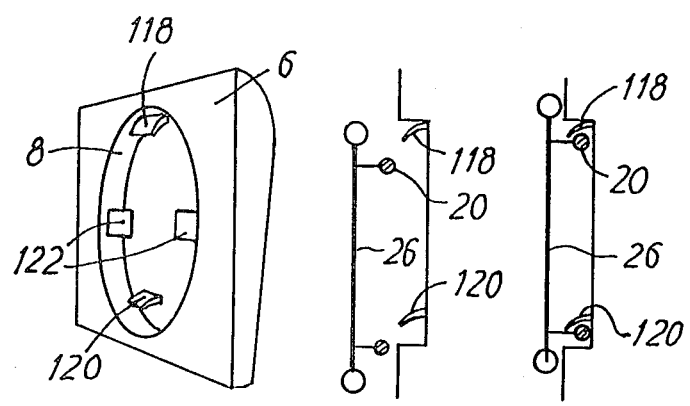
FIGS. 12a, b and c show a detail of a preferred door/wheel-chair arrangement for a vehicle according to the invention.

The recess 8 in the car door 6 may be provided with upper and lower protruding tongues 118, 120 and in-turned side guides 122 as seen in FIG. 12a, which automatically catch the wheel 20 as the wheel-chair 10 is moved towards the top of its journey (FIG. 12b), and guide it into its storage position. The recess 8 may also be provided with a stop member 124 having a normal position shown in FIG. 6 projecting from the recess, which, on arrival of the wheel-chair into its storage position (FIGS. 7 and 8a), is depressed by the wheel-chair to deactivate motor propulsion of the lifting arm 12. As the chair is removed from its storage position, the tongues and guides ease it out of the recess 8 to enable it to complete its downward movement. Alternatively, if bolts, clamps or like fixing devices have been used to secure the chair to the door 6, they may be used in combination with the tongues 118, 120 and guides 122.

A self-stowing strap, with or without loops or grips, may be fitted to any upward opening door of the vehicle to assist closure of said door by a disabled driver seated in a wheel-chair.

Although described in relation to the driver's side door, the above described adaptation may additionally or alternatively be carried out to one or more other doors of the vehicle, in particular the front near-side door for the use of a disabled companion.

Thus there is provided a means for adapting an existing general purpose private motor vehicle that a disabled driver, with or without a wheel-chair, can safely and conveniently open, enter, drive, exit from and close entirely through his own effort alone, and which at the same time can be used to carry passengers whether disabled or not. Further, the vehicle can easily be re-adapted back to is general purpose role for resale to the general public. The appearance of the adapted car does not remind the driver, nor does it readily advise other people, of his disability.

Figure 14:
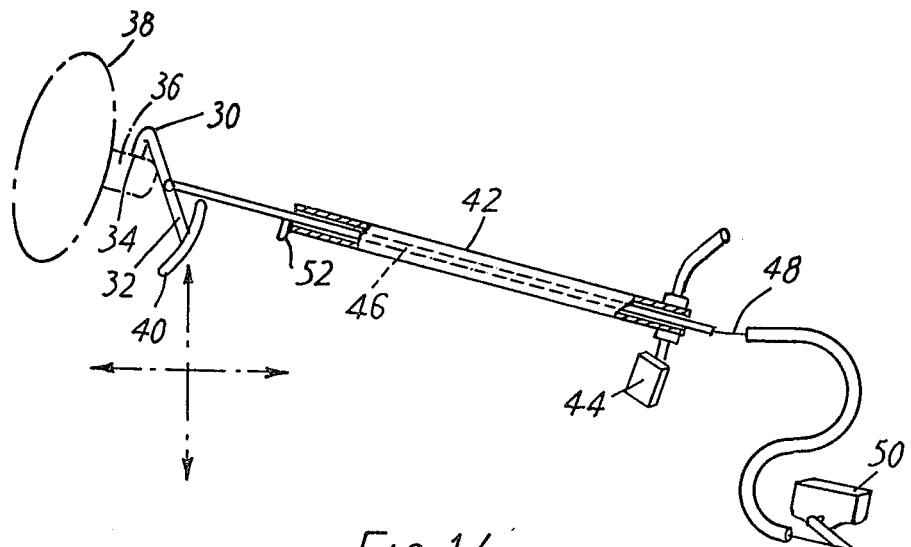
FIG. 14 shows a brake and accelerator control mechanism of a vehicle according to the invention.
Figure 15:
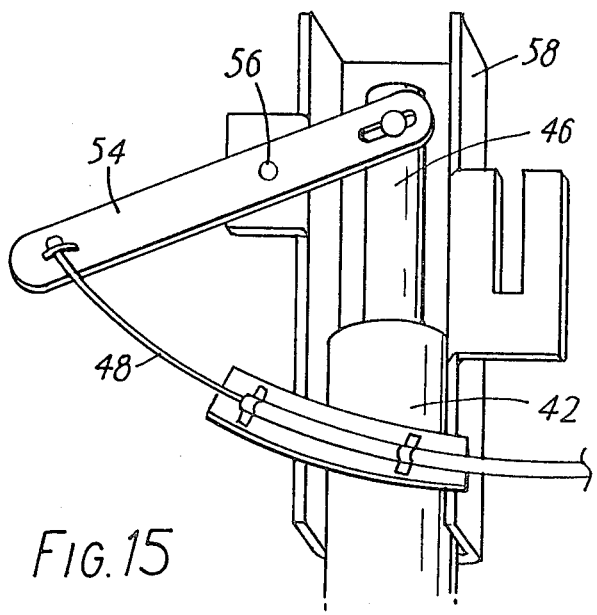
FIG. 15 shows in more detail the lower end of the mechanism of FIG. 14.

Referring to FIGS. 14 and 15 there is shown a driving control mechanism particularly suited to a vehicle as described above to be driven by a disabled person.

More particularly, one end 30 of a control handle 32 is pivotally mounted at 34 to the steering column 36 of the vehicle just below the steering wheel 38, said handle 32 being movable towards and away from the driver about the point 34 by means of a handgrip 40 secured to the free end of the handle.

A rigid tubular member 42 is attached to, to extend upwardly from, the brake pedal 44, said member 42 being movable with said pedal.

A rigid bar 46 is slidably mounted in the tubular member 42, the lower end of said bar being interconnected with the accelerator control cable 48 which in turn is connected to the carburettor 50. The upper end of the bar 46 extends beyond the tubular member 42 and is attached to an intermediate point on the handle 32.

A stop member 52 is integrally formed on the bar 46 to project radially thereof for abutment with the upper end of the tubular member 42.

The control mechanism so described has a neutral position shown in FIG. 14 in which the stop member 52 lies closely adjacent the upper end of the member 42, the throttle is closed and the brake is off. On movement of the handle 32 towards the driver, the rigid bar 46 is moved towards the driver through the stationary member 42 to open the throttle while the brake remains off. On movement of the handle 32 away from the driver, the rigid bar 46 is depressed to close the throttle, the stop member 52 then engaging with the tubular member 42. Further depression of the handle 32 results in both the member 42 and the bar 46 moving away from the driver as a unit to actuate the brake whilst the throttle remains closed.

As can be seen from FIG. 15, the lower end of the bar 46 can be connected to the accelerator control cable 48 by means of a lever 54 centrally pivoted at 56 to a part of the mechanism, for example a U-section bracket 58, integral with the tubular member 42. By varying the distance between the pivot point 56 and the point of attachment to the cable 48, the ratio between the distance pulled by the handle 32 and the distance needed for full travel of the carburettor control arm can be varied to suit particular requirements.

It will be appreciated that such an arrangement is an addition to, to provide an alternative means of control to, the standard pedals and is such that, if required, the pedals can still be used to control the vehicle in the conventional manner without any adaptation or modification being necessary.

What I claim and desire to secure by Letters Patent is:

1. A motor vehicle comprising
   a seat movable from a normal position within the vehicle to a displaced position projecting laterally outwardly of the vehicle,
   a lifting member on the inside of the door for raising a folded wheel-chair from the ground into a storage position against the inside of the door, and
   retaining means reacting between the door and the wheel-chair and operable to retain said wheel-chair in the storage position.

2. A motor vehicle as claimed in claim 1 in which the seat is mounted to be slidable laterally of the vehicle between its normal position and its displaced position.

3. A motor vehicle as claimed in claim 2 and comprising a pair of rails extending transversely of the vehicle along which the seat is slidable.

4. A motor vehicle as claimed in claim 3 in which the seat is movable fore and aft of the vehicle and vertically of said vehicle.

5. A motor vehicle as claimed in claim 1 in which the lifting member comprises an arm one end of which is pivotal about a substantially horizontal axis on the door and the other end of which is shaped to carry thereon the wheel-chair.

6. A vehicle as claimed in claim 1 including means for securing the wheel-chair to the door automatically at the end of the lifting operation.

7. A motor vehicle as claimed in claim 1 in which at least one of the other seats of the vehicle is movable from a normal position within the vehicle to a displaced position projecting laterally outwardly of the vehicle.

8. A motor vehicle as claimed in claim 7 in which the inside of the door associated with the at least one other seat has wheel-chair storage means thereon.

9. A motor vehicle as claimed in claim 1 further including a foldable wheel-chair from which at least one wheel can be removed.

10. A motor vehicle as claimed in claim 9 in which the wheel-chair includes handles which are movable from a normal, substantially horizontal position to a collapsed position, and a wheel-retaining mechanism, said movement of the handles being accompanied by release of said wheel retaining mechanism whereby a wheel can be removed from the wheel-chair.

11. A motor vehicle as claimed in claim 10 in which the wheel-chair includes front and rear transverse frames at different levels, said frames each being centrally hinged such that, on folding the wheel-chair, the frames lie one above the other.

12. A motor vehicle as claimed in claim 11 including a draw-cord attached to one part of each of the centrally hinged front and rear transverse frames, pulling on said draw-cord serving to effect collapse of the wheel-chair.

13. A motor vehicle as claimed in claim 1 and comprising a steering column, a hand-control lever for a brake and accelerator control mechanism one end of which is pivotally secured to said steering column adjacent the steering wheel, said mechanism including a rigid tubular member one end of which is secured to the brake pedal of the vehicle and the other end of which is located adjacent to but below said lever, a rigid rod member extending through, to be slidable in, said tubular member, the upper end of said rod member being attached to the lever and the lower end of said rod member being connected to the end of the accelerator control cable remote from the carburettor, and abutment means fixedly mounted on the rod member adjacent the upper end thereof for engagement with the other end of the tubular member to determine the limit of downward movement of the rod member relative to the tubular member, the mechanism having a neutral position in which the abutment means lies adjacent to the upper end of the tubular member, the brake is off and the accelerator is closed, the arrangement being such that, on pivoting movement of the lever in one direction from the neutral position to draw the rod member through the tubular member, the engine is accelerated and, on pivoting movement of the lever in the other direction from the neutral position, the rod member and tubular member are moved downwardly together to actuate to the brake.

14. A motor vehicle as claimed in claim 13 in which a pivotal lever connects the lower end of the rod member to the accelerator cable, one end of said lever being mounted to the rod member and the other end of said lever having the accelerator cable secured thereto, the lever being pivotal about an intermediate axis fixed relative to the tubular member.

15. A motor vehicle as claimed in claim 14 in which the brake and accelerator control mechanism is such as to permit operation of the brakes and accelerator directly by means of foot pressure on the brake pedal and accelerator pedal respectively.

* * * * *